(12) United States Patent
Honein et al.

(10) Patent No.: US 9,102,016 B2
(45) Date of Patent: Aug. 11, 2015

(54) TANK PLATE ERECTION SYSTEM

(71) Applicants: Younassan Joseph Honein, Cypress, TX (US); Joseph A Honein, Cypress, TX (US)

(72) Inventors: Younassan Joseph Honein, Cypress, TX (US); Joseph A Honein, Cypress, TX (US)

(*) Notice: Subject to any disclaimer, the term of this patent is extended or adjusted under 35 U.S.C. 154(b) by 0 days.

(21) Appl. No.: 14/194,283

(22) Filed: Feb. 28, 2014

(65) Prior Publication Data

US 2014/0178154 A1 Jun. 26, 2014

Related U.S. Application Data

(62) Division of application No. 13/134,561, filed on Jun. 10, 2011, now Pat. No. 8,701,832.

(51) Int. Cl.
*B23P 11/00* (2006.01)
*E04G 3/28* (2006.01)

(52) U.S. Cl.
CPC . *B23P 11/00* (2013.01); *E04G 3/28* (2013.01); *Y10T 29/49947* (2015.01)

(58) Field of Classification Search
CPC ..... B26P 11/00; E04G 3/28; Y10T 29/49623; Y10T 29/49616; Y10T 29/49947; Y10T 29/49625; Y10T 29/49629; Y10T 29/49632; Y10T 29/490634; Y10T 29/49968

USPC ........... 29/428, 897, 897.3, 897.31, 897.312, 29/897.33, 897.35; 182/223, 222.17; 413/1

See application file for complete search history.

(56) References Cited

U.S. PATENT DOCUMENTS

| | | | | |
|---|---|---|---|---|
| 1,086,329 | A | * | 2/1914 | Liess ............................... 182/12 |
| 4,848,516 | A | * | 7/1989 | Nakai et al. ..................... 182/36 |
| 6,227,430 | B1 | * | 5/2001 | Rosen et al. ................... 228/2.1 |

* cited by examiner

*Primary Examiner* — John C Hong
(74) *Attorney, Agent, or Firm* — Kenneth H John

(57) ABSTRACT

A system for constructing a tank is made up of a plurality of generally rectangular prism sections, which are hinged together on the back side to form a platform, having an end section hinged to a frame section, a cantilever frame extending from the end section, a counterbalance frame attached to said cantilever and extending parallel to the platform and opposed to the end section, with the end section and said counterbalance frame being separated by a pair of saddle wheels mounted to the cantilever frame. At least one additional saddle wheel is mounted on a frame section for cooperative operation with saddle wheels on the cantilever to support the system on the tank wall and to move the platform within the tank wall as it is constructed. The hinge connections between the sections allow the platform to be adjusted to the arc of the internal wall of the tank under construction.

4 Claims, 5 Drawing Sheets

TANK PLATE ERECTION SYSTEM

BACKGROUND OF THE INVENTION

This application is a division of U.S. Ser. No. 13/134,561 filed Jun. 10, 2011.

1. Field of the Invention

The present invention is an apparatus and process for the construction of storage tanks, particular for fluids, such as petroleum refinery products by assembling the tanks from steel plates. The present system is easily useable on site and serves as a replacement for conventional scaffolding.

2. Related Information

There are no other systems like the present system but there are man buggies that ride on the top ridge of current plate layers but they only hold one man per side, are limited to the scope of work can be performed, and cannot extend beyond the last plate fitted, therefore they are useless in erecting a new sheet or performing any of the prep work needed to place the new plate in place.

A problem solved by the present system is the safety of the workers. The workers perform their duties at high altitudes while supported by scaffolding. Erecting scaffolding and flooring it is unsafe, time-consuming, and expensive. Having to remove the scaffolding when the shell ring is finished and then to repeat the process on the new ring all these steps, creates more safety hazards and cost more time and money. In most cases the wood needed to deck the scaffolding require large numbers of big trees to be cut down to meet the needs of thousands of boards needed for every job.

This innovation allows the storage tank constructors to erect a tank comprising of hundreds of sheets of plate, in tank diameters of 50 feet to over 400 feet and layers of 2 to 20, without the need of first having to erect scaffolding prior to every sheet plate and ring.

SUMMARY OF THE INVENTION

Briefly the system of the present invention for constructing a tank comprises a plurality of frame sections, attached by a hinge to at least one other horizontally adjacent frame section to form a platform, an end section attached by a hinge to a frame section, a cantilever section extending from said end section, a counterbalance section attached to said cantilever section parallel to the platform and opposed to said end section, said end section and said counterbalance section being separated by a pair of saddle wheels mounted to the cantilever section and at least one additional saddle wheel attached to a frame section for cooperative operation with the pair of saddle wheels on a work product. The combination of the end section and cantilever section preferably extends above the framed sections. The hinge connections between the sections are positioned along an edge of a section adjacent to an edge of another section, with the hinges being on a plane of the sections distal to a work product. The work product will normally be a tank wall. The sections may each be characterized as rectangular prisms, In a preferred embodiment the end section extends below the framed sections. In a further embodiment at least one framed section extends above the platform a cooperative amount with said end section and forms a distal end to the platform from said end section.

The process of constructing a metal tank utilizing the present system comprises:

preparing a section of the internal surface of a tank adjacent to the system, positioning a system comprising a plurality of frame sections, attached by a hinge to at least one other horizontally adjacent frame section to form a platform, an end section attached by a hinge to a frame section, a cantilever section extending from said end section, a counterbalance section attached to said cantilever section parallel to the platform and opposed to said end section, said end section and said counterbalance section being separated by a pair of saddle wheels mounted to the cantilever section and at least one additional saddle wheel attached to a frame section for cooperative operation with the pair of saddle wheels, and mounted on a portion of an upper edge of a tank wall for cooperative operation with the pair of saddle wheels on the cantilever section, whereby said system is suspended from said tank wall.

Generally the pair of saddle wheels on the cantilever will be positioned on a higher portion of the tank wall being constructed and the additional saddle wheel will be positioned on lower section of the wall where the tank wall is being built. The present system is particularly suitable for welded tanks, where sheets of metal are added to the wall and welded in place. It is contemplated the cantilevered section of the platform will be supported on the higher side of the construction with additional plates being welded in place and the system rolled forward onto the added welded sections and so on, until a level is complete then the system is raised, clamped in place and a first section of a higher side welded on to support the cantilever and the process of building a ring repeated with the process repeated to the desired height of tank wall.

DETAILED DESCRIPTION AND A PREFERRED EMBODIMENT

Figure 1:
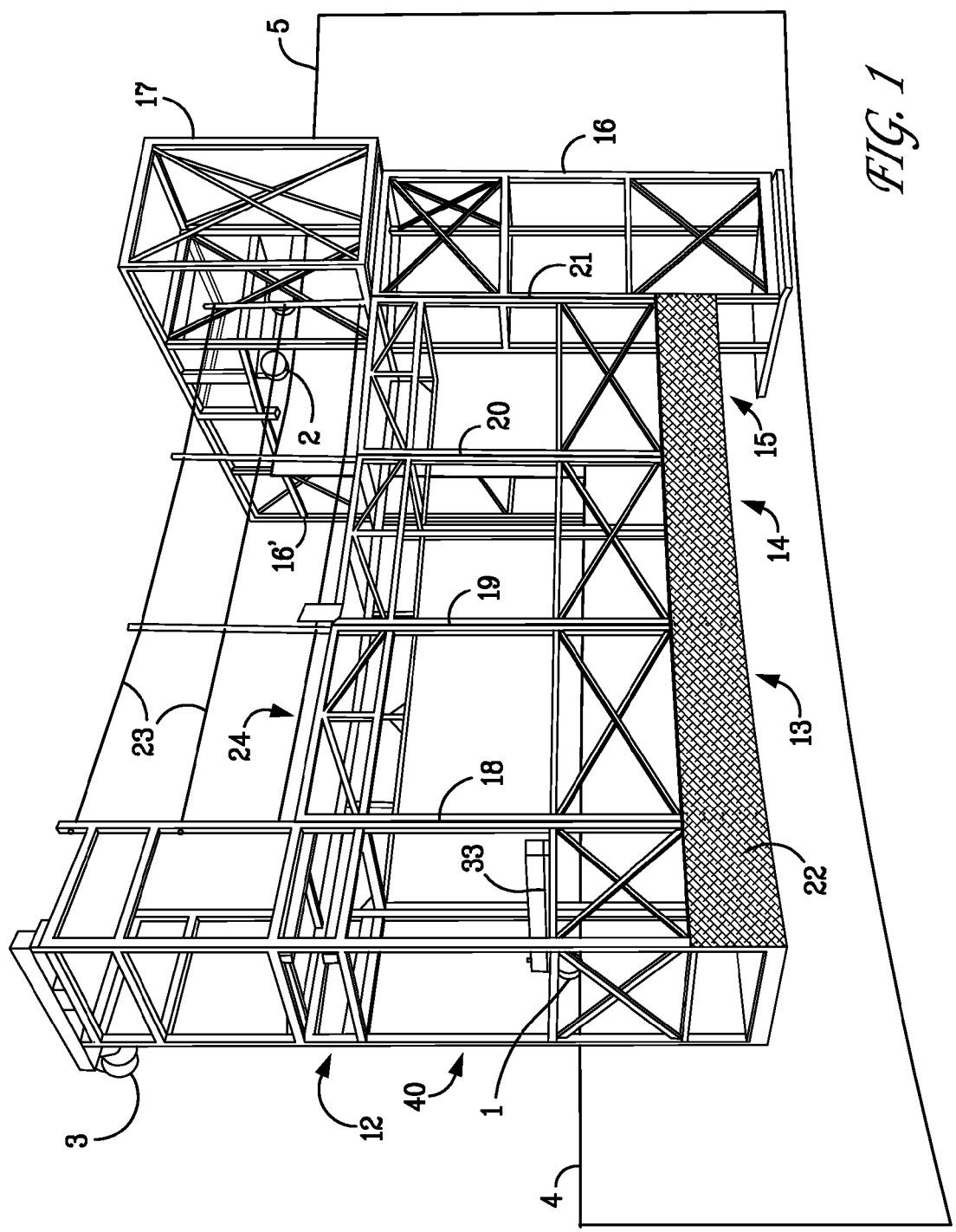
FIG. 1 is an isometric view of the present system for tank construction in positioned within the tank on partially completed wall section configuration.

The present erection system may be solely comprised of steel, aluminum and some plastics. The system is readily located where the work is needed, and rolled into the new position when the work is finished at the end of each plate. There is no need to erect scaffolding, or take it down, just roll into position and begin working. The system also is designed to provide a safe work area in the new un-erected plate zone and may be broadly characterized as:

a double-deck slide work platform comprising
individual swivel sections including:
an outer cantilever cage support system;
a outer saddle assembly;
a lower work level; and
lower and upper support roller brackets having
a double-deck roller head unit.

The scaffold system rides on the top ridge of the current plate layer, on the plate that has already been fitted and tacked in place. Also, at the far end, a roller system, rides and supports the system on the top ridge of the plates on the layer below. This allows the system to extend the full length needed, while being supported by the solid plates below and on the other side hanging and rolling on top of the plates of the current layer. The whole time the fitters are in an enclosed work area, surrounded on the rear, and sides by solid handrails. In the front where the work takes place, the workers are protected by removable railing and tied off to the system at all times. The system provides a lower and upper work deck. The lower work deck is used to fit the horizontal and vertical seams with ease. The top work deck is used for prep work for the next ring and also fitting the first and second plates of the next ring. The system could also be used with the roller wheels are set to run only on top of the current ring and allow the system to be used for duties other than hanging plates for example; welding, grinding, gouging, fitting, painting, x-raying, testing, etc. The second level was also floors and handrails in a removable fashion for the protection of the workers.

Generally the present shell plate system may be described as combined components designed and adapted to achieve a functionality as:

The double deck slide work platform is the main body of the system. It is comprised of tubing members made out of metal, aluminum, stainless steel, extrusion, or hard plastic of sizes varying from 1 inch to more than 6 inches. Any connection of two or more pieces is made using a welding process or fastening with screws, bolts, or any other adhesive means. The system is made in a form of a truss, the truss may be comprised of two or more cross members using tubing, angle, flat bar, or any other shape that may add strength to the truss. The truss members are comprised of two or more vertical or horizontal tubing or angle members connected in between any two or more members at varying degrees from 0 to 90° or 90 to 180.

An outer cantilever cage support system is used when a shell ring is complete and the need for welding, grinding, repair, etc. arises, and the double-deck roller head unit cannot be used. Then the outer cantilever cage support system is used to clamp to the top of the plate. The system is then used inside the outer cantilever cage support system sport to enable it to slide side to side while cantilevered, yet in a supported manner, this allows the fitter welders painters, etc. to work in the system cantilever but supported and tied off at the same time. When the work is finished, the scaffold system is moved back to center position in the outer cantilever cage support system, and then is rolled into the new position, clamped in place, and work is then resumed in a rapid and safe manner.

An outer saddle assembly is used to counter balance the load of the system on the sheet plate, provide support for the shell plate in key areas to prevent buckling of the plate when loaded, in ultra thin plate thickness situations. Mainly used as a holding area for the welding machines, air compressor, supplies, etc. and also provide a work area on the other side for work needed.

A lower work deck built in a truss fashion for rigidity and floored using small planking of wood, aluminum, or plastics. An upper work deck fabricated using aluminum tread plate sheeting. The upper work deck may swivel at one end in a hinged fashion to allow the worker to enter the upper deck from anywhere below while also providing a roof for the lower deck. The upper deck may have a handrail for employee safety.

The system may be composed of sections varying from 2 feet to 15 feet each section. The sections hinge on one side to allow the system to be altered for any diameter tank needed, and then bolted at the apposing side to maintain the set radius. These sections are fastened together to compose the needed length of the system to be able to fit the plates whether it may be 20, 25, 30, 40 etc.

Lower and upper support roller brackets are composed of a lower rolling assembly composed of a long or short roller or sliding assembly that rides and supports the platform while on the shell plate, providing support on the top ridge of the lower plate ring and supports the system by providing a continuous, supported rolling or sliding contact with a fixed structure to prevent any cantilever action. Saddled wheels, roller, slide assembly is also attached vertically from the lower plate assembly that comes into contact with the top of the first plate that was tacked, rolls on the top ridge of the shell plate and provides a cantilever support when the last plate of the ring is being fitted, and tacked, using the top ridge of the first plate tacked. Therefore as the last plate is being prepped for fitting the system will roll on the top ridge of the second to last plate, while also rolling on the ridge of the plates comprising the last section below. When the gap is closed and the system comes into contact with the vertical seam of the first plate tacked in that layer, it will engage the upper ridge of the plate with its upper roller bracket then it will disengage from the lower shell plate surface and be supported by the upper roller bracket on one side and the double deck roller head unit on the other side and the last plate can be fitted.

A double deck roller head unit is comprised of a fabricated frame with bearings and/or pillow blocks and shaft connected to a cylindrical object composed of tubing, pipe, rubber, plastic, or any extruded cylindrical component. It forms a small trussed box to be attached to the double deck slide work platform and enable the work platform to be supported on the top ridge of the plate using roller systems fabricated from steel rollers on bearings sandwiched between fabricated steel flat bars. These rollers are fixed to the head unit on the lower side of the channel or tubing head. These roller assemblies also incorporate a pinching clamp device to enable the system to be clamped. When this component is attached to the double deck slide work platform, it takes a saddle form, saddled on the top ridge of the shell plate with the outer saddle assembly. The head unit is propelled by an automatic or manual drive system. It is held together by mounting brackets or attachments using fasteners, bolts, welding etc. and is supported while elevated by the rollers on the top ridge of the plate and by the lower and upper support roller brackets, either on the plate of the finished ring below, or in the final plate application on top of the first plate that was tacked on the present ring. The plate travel erection system is comprised of a head composed of channel or tubing of any shape or an extruded member. The connecting members are comprised of tubing or extrusion of any substrate including steel, aluminum, stainless steel, or extruded component. The rolling structure is composed of a fabricated configuration using metal, aluminum, stainless steel, plastic, or an extruded material.

The present erection system is collapsible for easy disassembly and reassembly and reduced in size for easy shipping and designed with support roller assemblies along the vertical span of the host plate to prevent collapse, twist, and excessive deformation of the host plate during fitting of the ring. The system is built using a truss system that also prevents it from deforming or twisting or sagging while it is hanging on the shell plates. Along the systems span, hinge points have been designed to allow the span of the system to be adjusted to operate inside any given diameter of a large storage tank.

The double deck slide work platform will mainly be attached to the double deck roller head unit travel system to comprise the shell plate erection system. When connected together they form a saddle that rides on the top ridge of a fitted and tacked shell plate. It is designed and built in a way that when it sits on the plate ridge the far extremity will also be ridding on the plate ring below, so that the system is held in place by the upper shell plates and the lower shell plates. The system, when assembled together, provides a safe work environment for the employees as they perform their duties erecting shell plates on storage tanks while elevated off the ground. The system is fabricated in a manner that uses truss shapes on the top, sides, rear, and bottom of the system. These truss shapes provide the rigidity needed to keep the system together in a safe manner. The workers are therefore surrounded on all sides by barriers that prevent them from falling out while at the same time providing a safe environment in which to work. When placed on the shell ring the system provides an open work area the length of the new plate being raised to be fitted and tacked. An upper deck is in place with handrails. The employees are able to move freely along the span of the plate and perform their duties along the horizontal or vertical shell plate seams. The system also provides tie off points along the span of the system so the employees are tied off at all times. The lower and upper support roller brackets provide the support needed at the far end of the system by supporting the end of the system using the top ridge of the plates below, and in the case of the last plate the upper support wheels are used to saddle and ride on the top ridge of the first plate that was a fitted and tacked on that ring. In the case that the system is to be used for work after all the plates have been tacked only the top support wheel brackets are used to ride around the tank.

Figure 2:
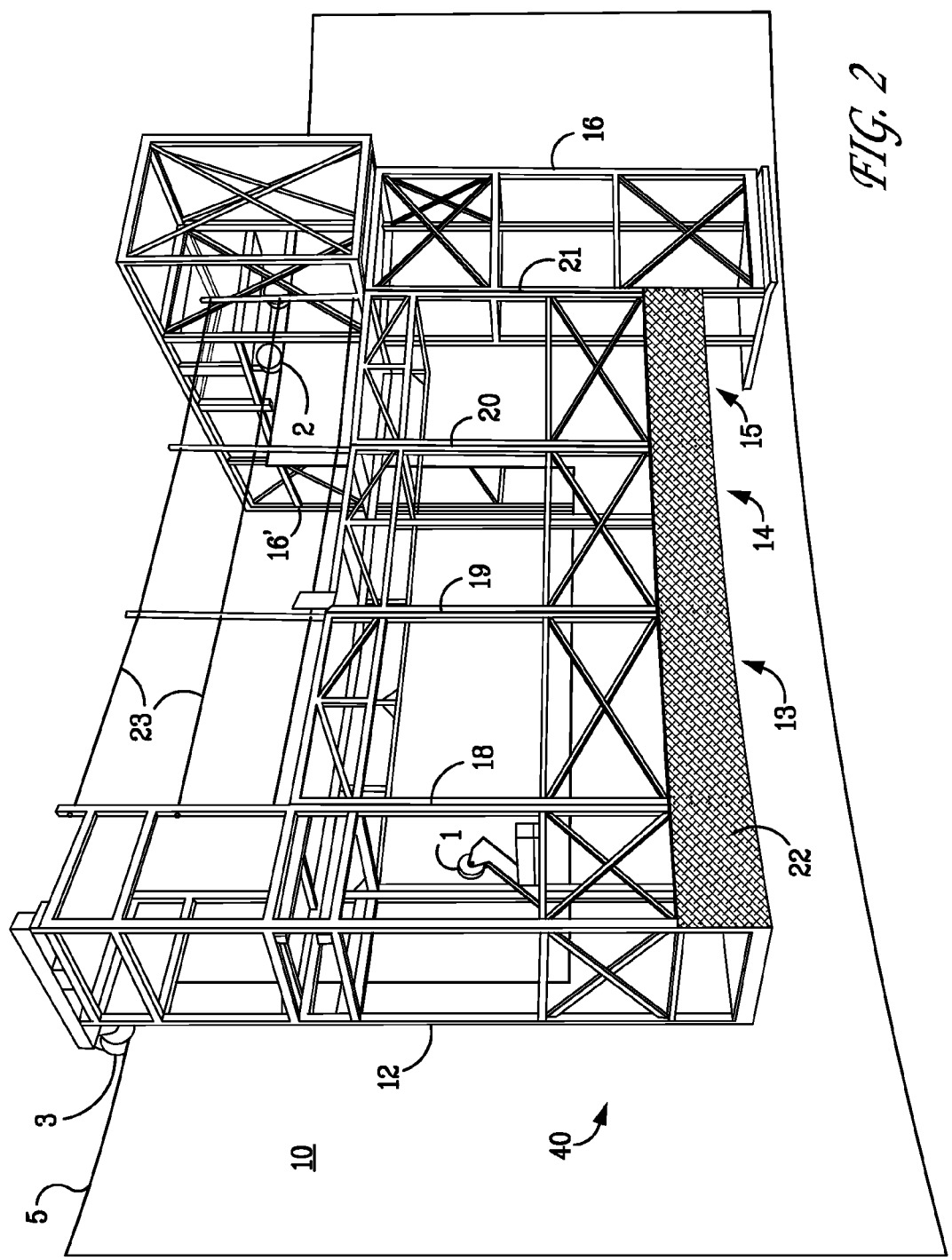
FIG. 2 is an isometric view of the present system for tank construction in positioned within the tank on partially completed wall section in a second configuration.
Figure 3:
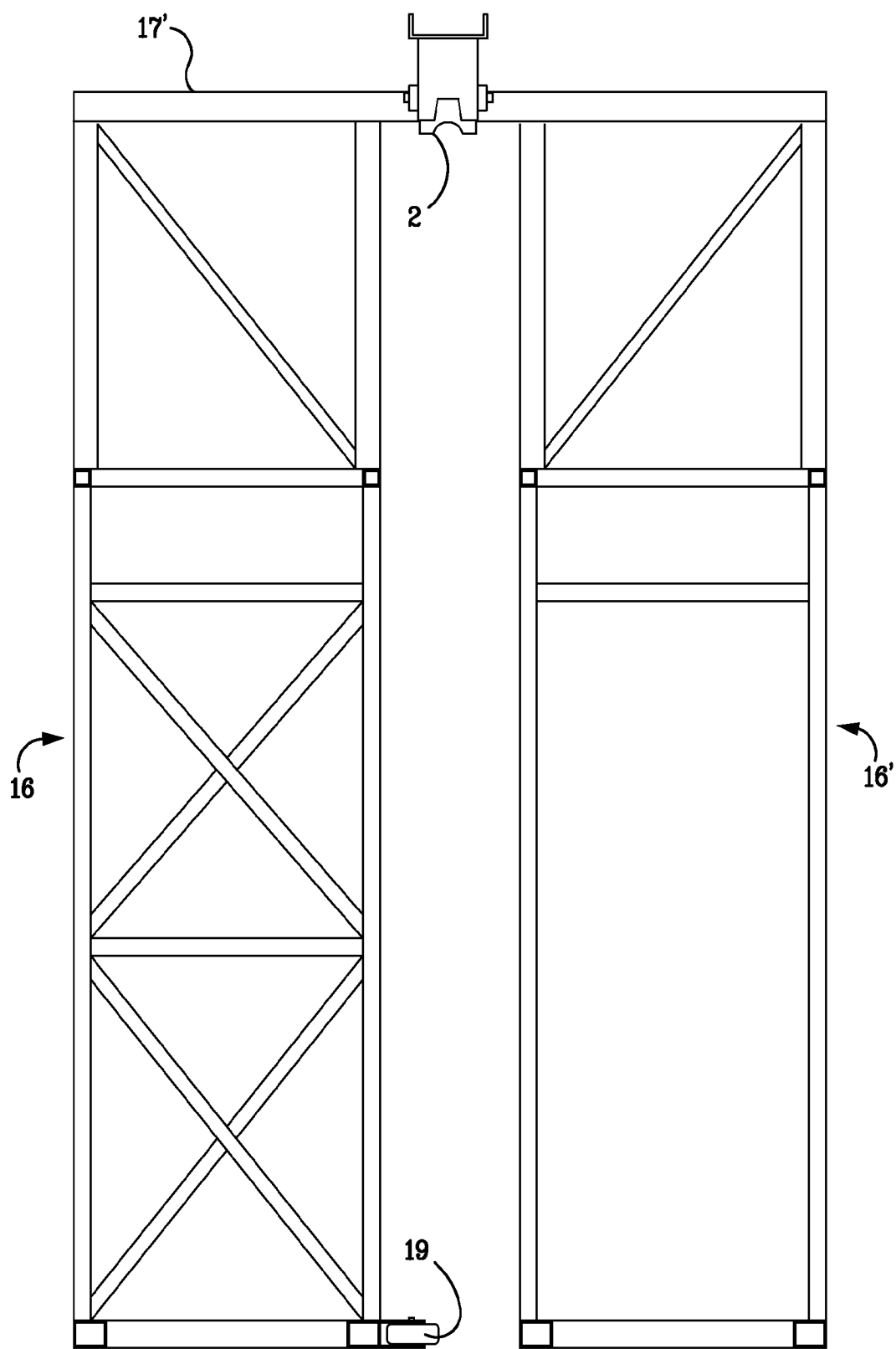
FIG. 3 is an in plan view of the end section, cantilever and counter balance section of the system of FIGS. 1 and 2 dismounted from a tank wall

A preferred embodiment is depicted in the figures. Referring to FIGS. 1, 2 and 3, the system is shown as a platform 40 situated inside of a metal storage tank construction (work piece) 10 and made up of various sections as rectangular prisms including five frame sections 12, 13, 14 and 15, and an end section 16, which provide a double deck work platform. Rectangular prisms 13, 14 and 15 are identical platform sections. The frame section 12 is elongated and adapted to engage the steel workpiece 10 either along a lower sheet of steel on upper edge 4 with saddle wheel 1 as shown in FIG. 1. A flexible safety screen 22 is provided at the back of the work area of the platform to prevent tools from being knocked off. Safety lines 23 are provided on the backside of the top level 24.

Cantilever section 17 is rigidly attached to end section 16 and extends off of the trailing end of the platform and rides of saddle wheels 2 and 2' on an upper edge 5' of a higher sheet of steel of workpiece 10. The sections forming platform are attached by hinges 18, 19, 20 and 21 along frame edges to an adjacent section in order to be angularly adjustable and locked in place by bolts and nuts, clamps other means (not shown) with appropriate shims or wedges (not shown) on the edged adjacent to the workpiece. This allows the system to be adjusted to match the arcuate curvature of the size tank under construction. The cantilever section 17 has a counterbalance section 16' (as shown in FIG. 3) opposing the end section 16 with the two being spaced apart and separated by the saddle wheels 2 attached to the cantilever section.

Counterbalance section 16' serves as not only as a counterbalance for the platform section and can serve as a storage area and supplemental work space for work required on the exterior of the tank wall. The system of the present invention rides of the upper edge of the upper welded sheet metal off of the ground. Depending on the size of the sheet metal, the wall of the constructed tank will usually be sufficient height, after the ground level sheets have been welded in place and one upper level section, for the cantilever section 17 to be supported on saddle wheels 2 off of the ground. The present system serves as a ground based scaffold for preparing a portion of the tank wall on which to suspend the system.

Figure 4:
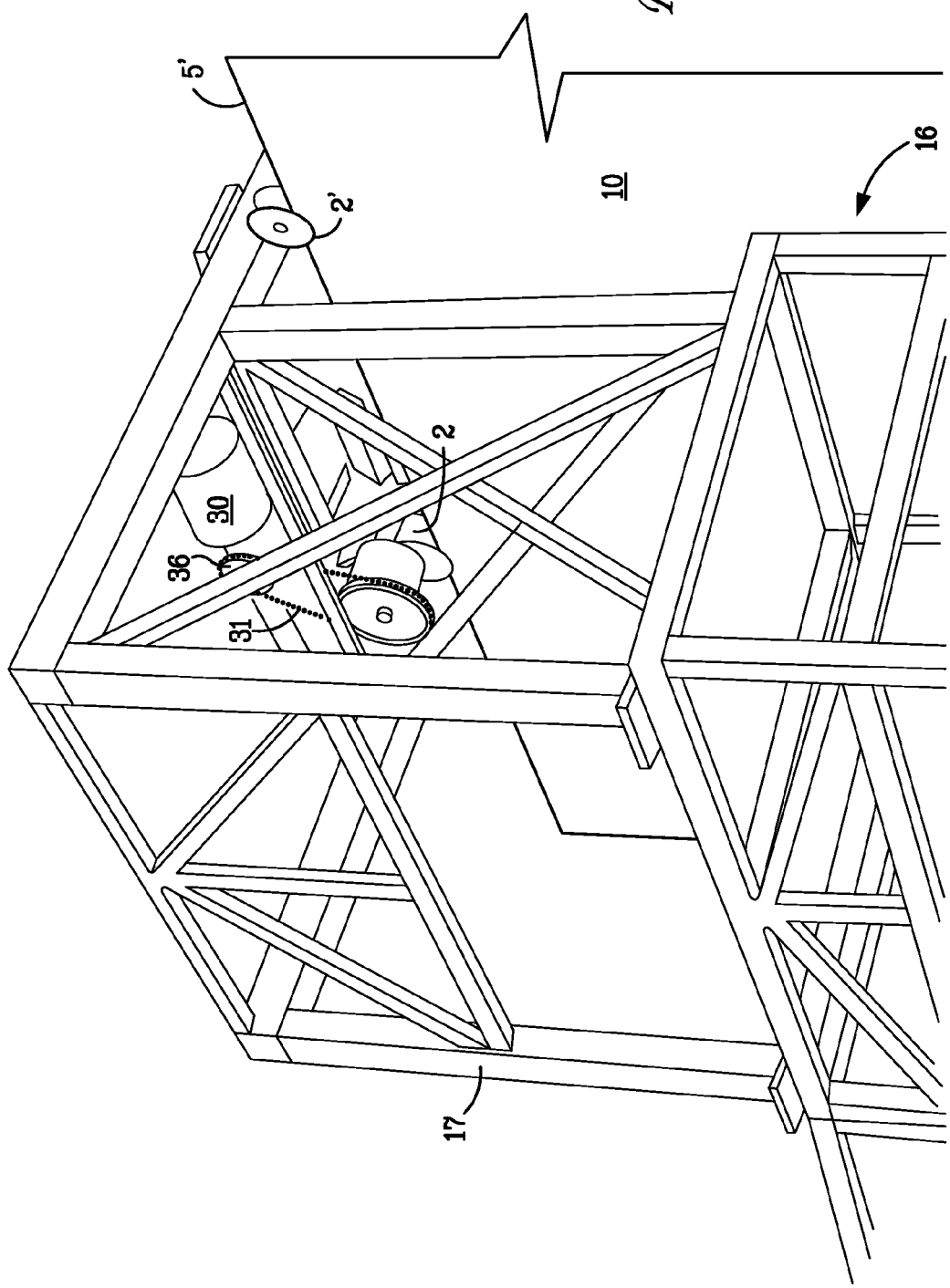
FIG. 4 is a detail of view of the cantilever section of the system position on a tank wall as generally shown in FIGS. 1 and 2 showing an embodiment with motor drive system for the system.

The system can be pushed along the upper edge or may be powered such as by an electric motor 30 mounted in the cantilever section 17 through chain drive 31 to sprocket 36 attached to saddle wheel 2 which is seated against the top edge 5' of the workpiece as shown in FIG. 4 can move the platform either to the right or left.

Figure 5:
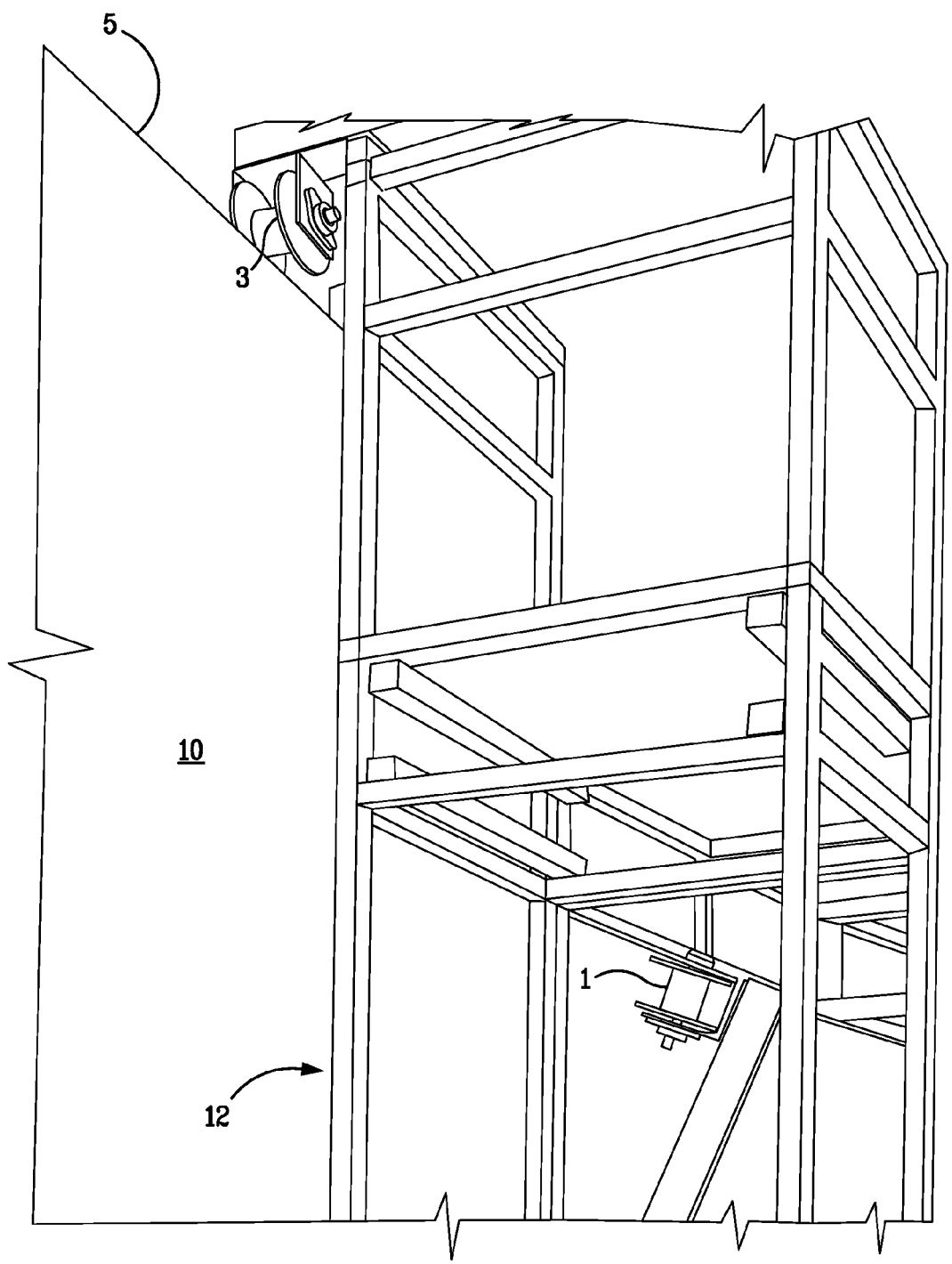
FIG. 5 is detail of the portion of the left end of system of FIG. 2, having an alternative configuration of the end section, cantilever section, counterbalance section.

In FIG. 2 the platform 40 is shown positioned with the tank wall 10 for a work level being nearly complete. The top edge 5' is at a lower level than top edge 5 which is the next level where plates are to be welded in place. As the space in the tank wall between edge 5 and 5' is completed, the saddle wheel 1 is raised on hinged arm 33 and held within the frame of the platform out of the way as shown in FIGS. 2 and 5 and the platform is supported on saddle wheels 3 and 2. When the tank wall is completed to particular level the platform can be repositioned with saddle wheel 1 mounted of top edge of the work piece and the frame section 15 and the cantilever section clapped on to tank wall until the tank wall is welded to the level to support the saddle wheels 2 and the construction continued to the desired wall height using the platform as previously described for the lower level.

Referring now to FIG. 5, an alternative configuration for the combination of the end section 16, cantilever section 17 and counterbalance section 16'. The difference lies in the cantilever section may be characterized as a frame sized rectangular prism 17' attaching the end section 16 and the counterbalance section 16' with the saddle wheels 2 being mounted to the frame 17'.

The roller 19 is depicted in the alternative configuration of FIG. 5, but is also a preferred element of the system in any configuration, since this feature prevents the support system from inadvertent contact with the tank and the binding friction and potential damage from such contact.

The erection system is easily set up on the ground then lifted onto the existing first level shell ring and work is conducted in an enclosed area with the employees tied off at all times. The scaffold system is preferably manually positioned, while it could be automatically moved into place by a chain and sheave and is placed where the new shell plate is to be fitted. The left or right side of the erection system, depending on whether the erection in clockwise or counterclockwise, is built in a manner that the shell plate can be fitted in front of the employee and the fitter has access to the full 20 to 40+feet of horizontal length of the shell plate and the vertical seam with the adjacent plate.

The left or right side of the scaffold system is clamped in place on the previously fitted and tacked plate. When the fitting is complete, the system is unclamped and rolled onto the shell plate that was just fitted and tacked, and awaits a new plate to be raised into place in front of it.

When the last plate is fitted, the fitter can go to the upper deck and fit the key channels for the first plate of the new ring, receive and fit the new plate, Tack it, then the system is raised and placed on the first plate of the new ring. The next ring can continue in the same manner as the previous ring.

At all times the employees are in a relatively safe environment, surrounded by handrails, tied off to the top of the system, and at the same time with an open easy access to the work area needed. The floor of the system is composed of a hard substrate of wood, metal, aluminum, or plastic, whichever the customer would prefer, kick plates are installed to protect the people below and prevent equipment from falling and striking personnel on the ground. The system is saddled on the plate and provides a well-balanced fit that helps to prevent plate buckle.

In an extreme situation, such as during the construction of a double walled LNG tank, the system provides the less than 1 meter work depth required in between the two shell walls without the need of all the conventional scaffolding and upon removing said scaffolding, the testing of each weld joint that was used to hold the scaffolding in place for stress cracks.

The erection system can also be used as a man basket used to raise employees onto and off the work area using a crane.

The invention claimed is:

1. A process of constructing a metal tank utilizing the present system comprises:

preparing a section of an internal surface of a tank adjacent to the system, positioning a system comprising a plurality of frame sections, attached by a hinge to at least one other horizontally adjacent frame section to form a platform, an end section attached by a hinge to a frame section, a cantilever section extending from said end section, a counterbalance section attached to said cantilever section parallel to the platform and opposed to said end section, said end section and said counterbalance section being separated by a pair of saddle wheels mounted to the cantilever section and at least one additional saddle wheel attached to a frame section and mounted on a portion of an upper edge of a tank wall for cooperative operation with the pair of saddle wheels on the cantilever section, whereby said system is suspended from said tank wall.

2. The process according to claim 1 wherein the additional saddle wheel is mounted on a distal portion of an upper edge to the pair of saddle wheels.

3. The process according to claim 1 wherein the pair of saddle wheels on the cantilever section will be positioned on a higher portion of the tank wall being constructed and the additional saddle wheel will be positioned on a lower section of the wall the tank wall.

4. The process according to claim 1 wherein said tank is comprised of welded sheets of metal are added to the wall and welded in place.

* * * * *